US008793765B2

(12) United States Patent
Volmat et al.

(10) Patent No.: US 8,793,765 B2
(45) Date of Patent: Jul. 29, 2014

(54) DATA PROCESSING APPARATUS AND COMPUTER-READABLE RECORDING MEDIUM

(75) Inventors: Alain Volmat, Tokyo (JP); Shizu Kanauchi, Kanagawa (JP); Yoshinaga Kato, Kanagawa (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/344,737

(22) Filed: Jan. 6, 2012

(65) Prior Publication Data

US 2012/0185685 A1 Jul. 19, 2012

(30) Foreign Application Priority Data

Jan. 17, 2011 (JP) ................................. 2011-006934
Nov. 18, 2011 (JP) ................................. 2011-253177

(51) Int. Cl.
*H04L 29/00* (2006.01)

(52) U.S. Cl.
USPC ............... 726/3; 380/247; 380/248; 380/249; 380/250

(58) Field of Classification Search
USPC ................................................. 380/247–250
See application file for complete search history.

(56) References Cited

U.S. PATENT DOCUMENTS

| 8,479,000 | B2 | 7/2013 | Takayama et al. | |
| 2002/0046353 | A1* | 4/2002 | Kishimoto | 713/202 |
| 2006/0154695 | A1* | 7/2006 | Ishibashi | 455/558 |
| 2008/0317250 | A1* | 12/2008 | Matsuo et al. | 380/279 |
| 2010/0325435 | A1* | 12/2010 | Park et al. | 713/171 |
| 2011/0219060 | A1 | 9/2011 | Ohwada et al. | |

FOREIGN PATENT DOCUMENTS

| CN | 1402117 A | 3/2003 |
| CN | 200944241 Y | 9/2007 |
| CN | 101122939 A | 2/2008 |
| CN | 201130381 | 10/2008 |
| JP | 3945088 | 4/2007 |
| JP | 2011-205612 | 10/2011 |
| WO | WO 2010/041464 A1 | 4/2010 |

OTHER PUBLICATIONS

Japanese Office Action dated Oct. 15, 2013 for Japanese Patent Application No. 2013-146626.
Tomoya Sakai et al., "Evaluation of Public Key Cryptosystem Hardware of Processor That Has Program Protection Feature", IPSJ SIG Technical Report, vol. 2006, No. 127, pp. 19-24, Nov. 28, 2006.
Office Action with English translation issued on Jan. 30, 2014, in counterpart Chinese Appln No. 201210010940.X (21 pages).

* cited by examiner

*Primary Examiner* — Ghazal Shehni
(74) *Attorney, Agent, or Firm* — Oblon, Spivak, McClelland, Maier & Neustadt, L.L.P.

(57) ABSTRACT

Disclosed is a data processing apparatus providing a predetermined function by executing a program for the data processing apparatus, including a first storage unit that stores encoded execution starting data for starting execution of the program; a first decode key storage unit that stores a first decode key capable of decoding the encoded execution starting data; a start up unit that obtains the first decode key from the first decode key storage unit when turning on the power is accepted and decodes the encoded execution starting data by the first decode key to start executing the program; and an authentication confirmation unit that sends a request for authentication to an external apparatus after the start up unit starts executing the program and starts providing the predetermined function when obtaining an authentication result indicating the apparatus is authenticated from the external apparatus.

16 Claims, 14 Drawing Sheets

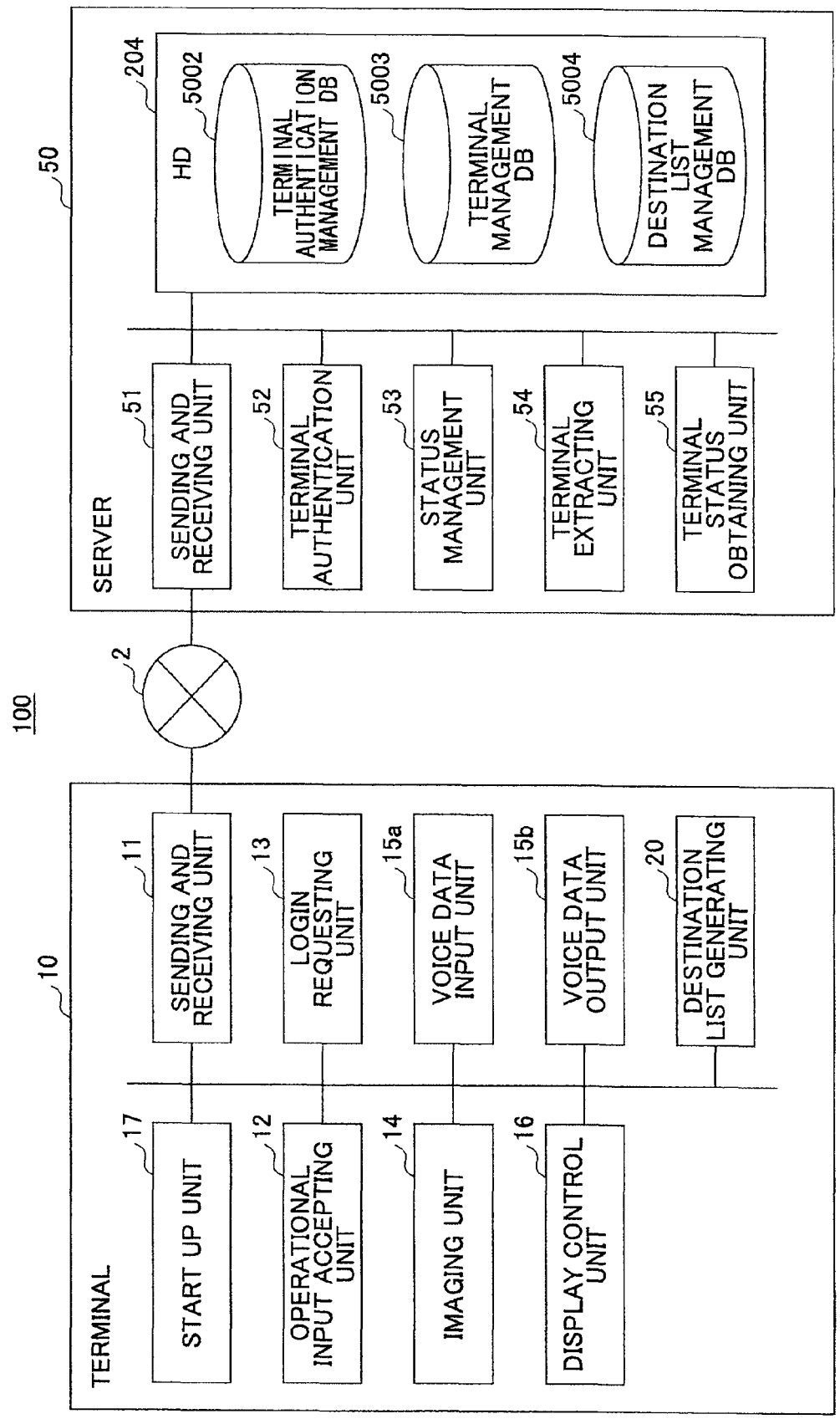

FIG.5A

| terminal ID | password |
|---|---|
| 01aa | aaaa |
| 01ab | abab |
| 01ba | baba |
| ... | ... |

FIG.5B

| terminal ID | name | online status | received date | IP address of terminal |
|---|---|---|---|---|
| 01aa | terminal AA, Tokyo, Japan | ON line (communication capable) | 2009.11.10.13:40 | 1.2.1.3 |
| 01ab | terminal AB, Tokyo, Japan | OFF line | 2009.11.09.12:00 | 1.2.1.4 |
| ... | ... | ... | ... | ... |
| 01ba | terminal BA, Osaka, Japan | ON line (temporarily interrupted) | 2009.11.10.13:45 | 1.2.2.3 |
| 01bb | terminal BB, Osaka, Japan | ON line (communication capable) | 2009.11.10.13:50 | 1.2.2.4 |
| ... | ... | ... | ... | ... |
| 01ca | terminal CA, New York, US | OFF line | 2009.11.10.12:45 | 1.3.1.3 |
| 01cb | terminal CB, New York, US | ON line (having communication) | 2009.11.10.13:55 | 1.3.1.4 |
| ... | ... | ... | ... | ... |
| 01da | terminal DA, Washington, US | ON line (having communication) | 2009.11.08.12:45 | 1.3.2.3 |
| 01db | terminal DB, Washington, US | OFF line | 2009.11.10.12:45 | 1.3.2.4 |
| ... | ... | ... | ... | ... |

FIG.5C

| requesting terminal ID | destination terminal ID |
|---|---|
| 01aa | 01ab,・・・,01ba,01bb,・・・,01ca,01cb,01da,01db,・・・ |
| 01ab | 01aa,01ca,01cb |
| 01ba | 01aa,01ab,01ca,01cb,01da,01db |
| ... | ... |
| 01db | 01aa,01ab,01ba,・・・,01ca,01cb,・・・,01da |

FIG.7 select terminal and start video conference by "determine"

| icon | online status data | destination name |
|---|---|---|
| | | terminal ID |
| ◯ | ON line (having communication) | terminal AA, Tokyo, Japan, terminal AB, Tokyo, Japan |
| | | 01aa, 01ab |
| ◯ | ON line (communication capable) | terminal BA, Osaka, Japan |
| | | 01ba |
| ◯ | OFF line | terminal BB, Osaka, Japan |
| | | 01bb |
| ◯ | OFF line | terminal QA, Kyusyu, Japan |
| | | 01qa |
| ◯ | OFF line | terminal CA, New York, US |
| | | 01ca |
| ◯ | OFF line (connecting) | terminal CB, New York, US |
| | | 01cb |
| ◯ | OFF line (connecting) | terminal DA, Washington, US |
| | | 01da |
| ⇦ | ON line | user's terminal |
| | | 01xx |

500

502

DATA PROCESSING APPARATUS AND COMPUTER-READABLE RECORDING MEDIUM

BACKGROUND OF THE INVENTION

1. Field of the Invention

The present invention relates to a data processing apparatus connected to a server via networks and a computer-readable recording medium and more specifically, to a data processing apparatus capable of providing its function with an authentication by a server and a computer-readable recording medium.

2. Description of the Related Art

There is known a network system in which a terminal accessing a server uses a function provided by the server. In this case, the server authenticates a user by an ID and a password sent by the terminal so that only a specified user can use the function of the server (Japanese Patent No. 3945088 for example).

It is disclosed in Japanese Patent No. 3945088 a data searching system in which, when a personal computer (PC) stores content of a database in a memory card, the content of the database is encoded by a DB key and the DB key is encoded by an encoded password corresponding to a user. At this time, the encoded DB key and the encoded password are also stored in the memory card. In the system, when a mobile terminal accesses the database from the memory card, the system accepts a password from the user, encodes the accepted password by the password itself, compares the obtained encoded password to the encoded password stored in the memory card, and permits accessing to the database when these passwords match.

However, there may be a case where a terminal that uses a function provided by a server to provide a service to a user is a built-in type apparatus which does not include a user interface (UI) such as an input unit or a display unit, different from PCs or mobile terminals. Such built-in type apparatuses are widely used in consumer electronics, industrial electronics or the like to actualize specific functions.

In such a case, it is difficult for a user to input information for authentication such as a password or the like.

SUMMARY OF THE INVENTION

The present invention is made in light of the above problems, and provides a data processing apparatus capable of authentication without requesting a user to input a password.

The present invention has been made based on the knowledge the inventors have obtained and has the following configurations.

According to an embodiment, there is provided a data processing apparatus providing a predetermined function by executing a program for the data processing apparatus including, an operational input accepting unit that accepts turning on power; a first storage unit that stores encoded execution starting data for starting execution of the program for the data processing apparatus; a first decode key storage unit that stores a first decode key capable of decoding the encoded execution starting data; a start up unit that obtains the first decode key from the first decode key storage unit when the operational input accepting unit accepts turning on the power and decodes the encoded execution starting data by the first decode key to start executing the program for the data processing apparatus; and an authentication confirmation unit that sends a request for authentication to an external apparatus after the start up unit starts executing the program for the data processing apparatus and starts providing the predetermined function when obtaining an authentication result indicating the apparatus is authenticated from the external apparatus.

According to another embodiment, there is provided a non-transitory computer-readable recording medium having recorded thereon a program that causes a data processing unit, which is composed of a computer, stores encoded execution starting data for starting execution of a program for the data processing apparatus, a first decode key capable of decoding the encoded execution starting data, and provides a predetermined function, to execute a method. The method includes accepting turning on the power; obtaining the first decode key when turning on the power is accepted and decoding the encoded execution starting data by the first decode key to start executing the program for the data processing apparatus; sending a request for authentication to an external apparatus after starting execution of the program for the data processing apparatus; and starting providing the function when obtaining an authentication result indicating the apparatus is authenticated from the external apparatus.

BRIEF DESCRIPTION OF THE DRAWINGS

Other objects, features and advantages of the present invention will become more apparent from the following detailed description when read in conjunction with the accompanying drawings.

FIG. 4 is an explanatory view of an example of a functional block diagram of the terminal authentication system;

FIG. 5A is a drawing showing an example of a terminal authentication management table;

FIG. 5B is a drawing showing an example of a terminal management table;

FIG. 5C is a drawing showing an example of a destination list management table;

FIG. 7 is a drawing showing an example of a destination list generated by a destination list generating unit in step S34 in FIG. 6;

DETAILED DESCRIPTION OF THE PREFERRED EMBODIMENTS

Figure 1:
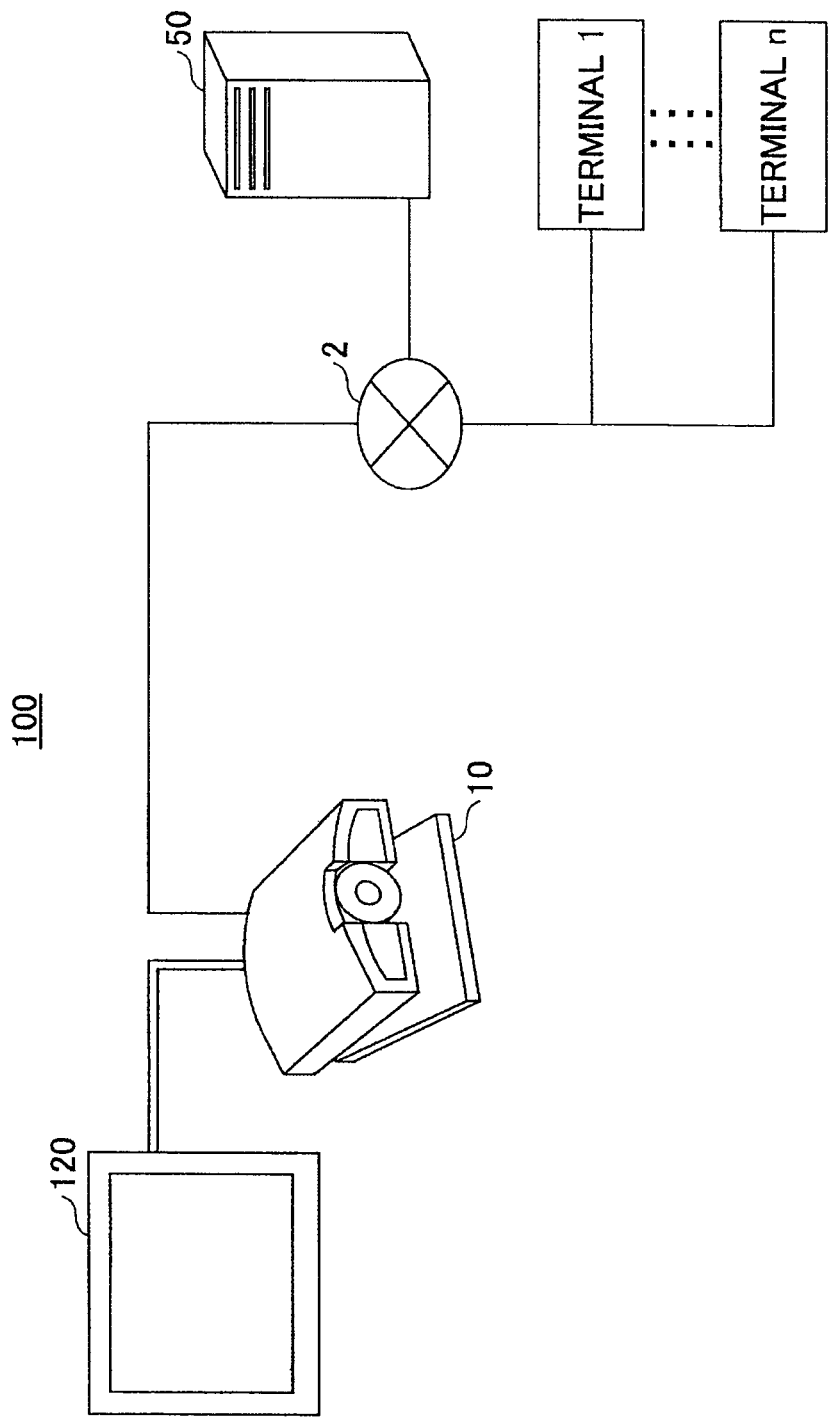
FIG. 1 an explanatory view of an example of a terminal authentication system.

The invention will be described herein with reference to illustrative embodiments. Those skilled in the art will recognize that many alternative embodiments can be accomplished using the teachings of the present invention and that the invention is not limited to the embodiments illustrated for explanatory purposes.

Next, embodiments of the present invention will be described below with reference to drawings.

It is to be noted that, in the explanation of the drawings, the same components are given the same reference numerals, and explanations are not repeated.

FIG. 1 an explanatory view of an example a terminal authentication system 100 according to the present embodiment.

The terminal authentication system 100 includes a server 50 and plural terminals (including a terminal 10 and terminals 1 to n) connected via a communication network 2. Although the terminal 10 may be any kinds of devices, a data processing apparatus including a projector is shown in FIG. 1 as the terminal 10 for example. An external display 120 is connected to the terminal 10. The server 50 provides various services such as authenticating terminals, sending various data, updating programs stored in the terminals or the like.

The terminals 1 to n may be data processing apparatuses having the same function as that of the terminal 10, or data processing apparatuses having different functions from that of the terminal 10. The terminal 10 and one or more of the terminals 1 to n are capable of sending and receiving data with each other through the server 50.

The communication network 2 may be an in-house LAN, a WAN in which LANs are connected through Ethernet (registered trademark), an IP-VPN or the like, an Internet which is connected with the LAN or the WAN through a router or the like. The terminal 10 and the terminals 1 to n are capable of having communications with each other within an office, a company, or between offices or branch offices of different countries, or the like. The communications may be confidentially performed by a secure socket layer (SSL) or the like.

Figure 2:
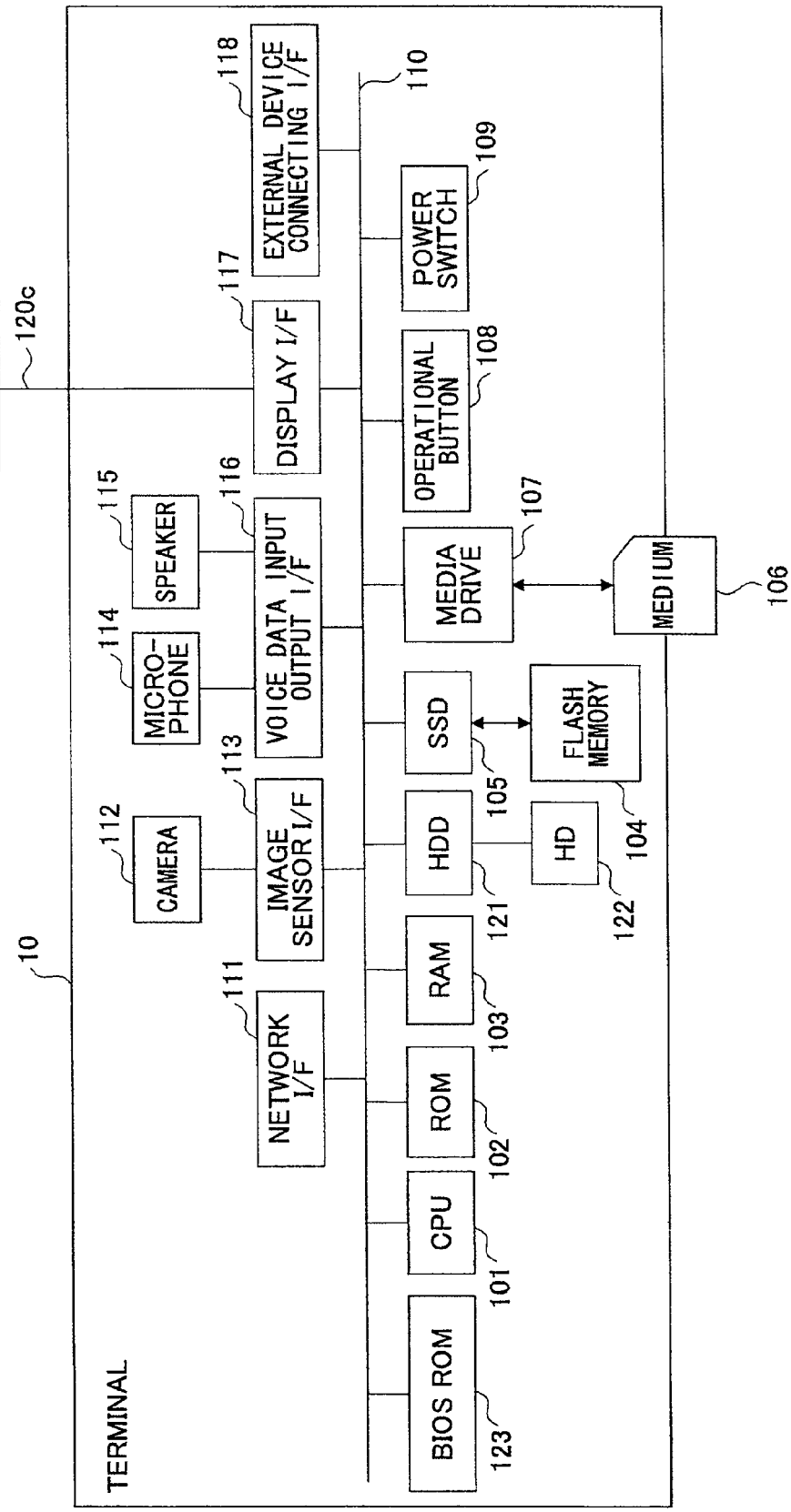
FIG. 2 is an explanatory view of an example of a hardware structure of a terminal.

FIG. 2 is an explanatory view of an example of a hardware structure of the terminal 10.

The terminal 10 includes a central processing unit (CPU) 101, a read-only memory (ROM) 102, a random access memory (RAM) 103, a hard disk (HD) 122, a hard disk drive (HDD) 121, a flash memory 104, a solid state drive (SSD) 105, a media drive 107, an operational button 108, a power switch 109, a network Interface (I/F) 111, an internal camera 112, an image sensor I/F 113, an internal microphone 114, an internal speaker 115, a voice data input output I/F 116, a display I/F 117, an external device connecting I/F 118, a basic input/output system (BIOS) ROM 123, and a bus line 110.

The CPU 101 completely controls the terminal 10. The ROM 102 stores a program for driving the CPU 101 such as an initial program loader (IPL) or the like. The RAM 103 is used as a working area of the CPU 101.

The HD 122 stores various data such as a program for the terminal (which is simply referred to as a terminal program hereinafter), terminal identification data (ID) that uniquely identifies the terminal 10 or the like.

The HDD 121 controls reading and writing of various data from the HD 122 in accordance with the control of the CPU 101.

The flash memory 104 stores various data such as video data, voice data and the like. The SSD 105 controls reading and writing of various data from the flash memory 104 in accordance with the control of the CPU 101.

The media drive 107 controls reading and writing (recording) of data from a recording medium 106 such as a flash memory or the like.

The operational button 108 is operated to select a destination terminal to communicate with, which is opposite of the terminal 10.

The power switch 109 switches on and off the power of the terminal 10.

The network I/F 111 performs data transmission through the communication network 2.

The BIOS ROM 123 stores a program for inputting and outputting data at a basic level between hardware.

The internal camera 112 takes a photograph in accordance with the control of the CPU 101 to obtain image data. The image sensor I/F 113 controls driving of the internal camera 112. The internal microphone 114 inputs voice data. The internal speaker 115 outputs voice data. The voice data input output I/F 116 processes input and output of voice signals between the internal microphone 114 and the internal speaker 115 in accordance with the control of the CPU 101.

The display I/F 117 transmits image data to the external display 120 in accordance with the control of the CPU 101. The external device connecting I/F 118 connects various external devices to the terminal 10. The bus line 110 may be an address bus, a data bus and the like which electrically connect the above components.

The external display 120 may be a display unit composed of a liquid crystal display (LCD) or an organic electroluminescence (EL) display on which an image of an object, operational icons or the like are shown. The external display 120 may include a touch panel. The external display 120 is connected to the display I/F 117 through a cable 120c. The cable 120c may be a cable for analog RGB (VGA) signals, a cable for a component video, or a cable for a high-definition multimedia interface (HDMI) or a digital video interactive (DVI).

The internal camera 112 includes a lens, and a solid-state image sensing device such as a complementary metal oxide semiconductor (CMOS), a charge coupled device (CCD) or the like that converts light into charges to form an electronic image of an object.

External devices such as an external camera, an external speaker, and the like are capable of being connected to the external device connecting I/F 118 through universal serial bus (USB) cables or the like. When the external camera is connected, the external camera may be driven in preference to the internal camera 112 in accordance with the control of the CPU 101. Similarly, when the external microphone or the external speaker is connected, the external microphone or the external speaker may be driven in preference to the internal microphone 114 or the internal speaker 115 in accordance with the control of the CPU 101, respectively.

The recording medium 106 is removable with respect to the terminal 10. Further, an electrically erasable and programmable ROM (EEPROM) or the like may be used instead of the flash memory 104 as long as it is a nonvolatile memory capable of having data read and written from in accordance with the control of the CPU 101.

The terminal program may be stored in a computer readable recording medium such as the recording medium 106 or the like in a file format to be distributed which is installable and executable by a computer. Alternately, the terminal program may be stored in the ROM 102 instead of being stored on the HD 122.

Figure 3:
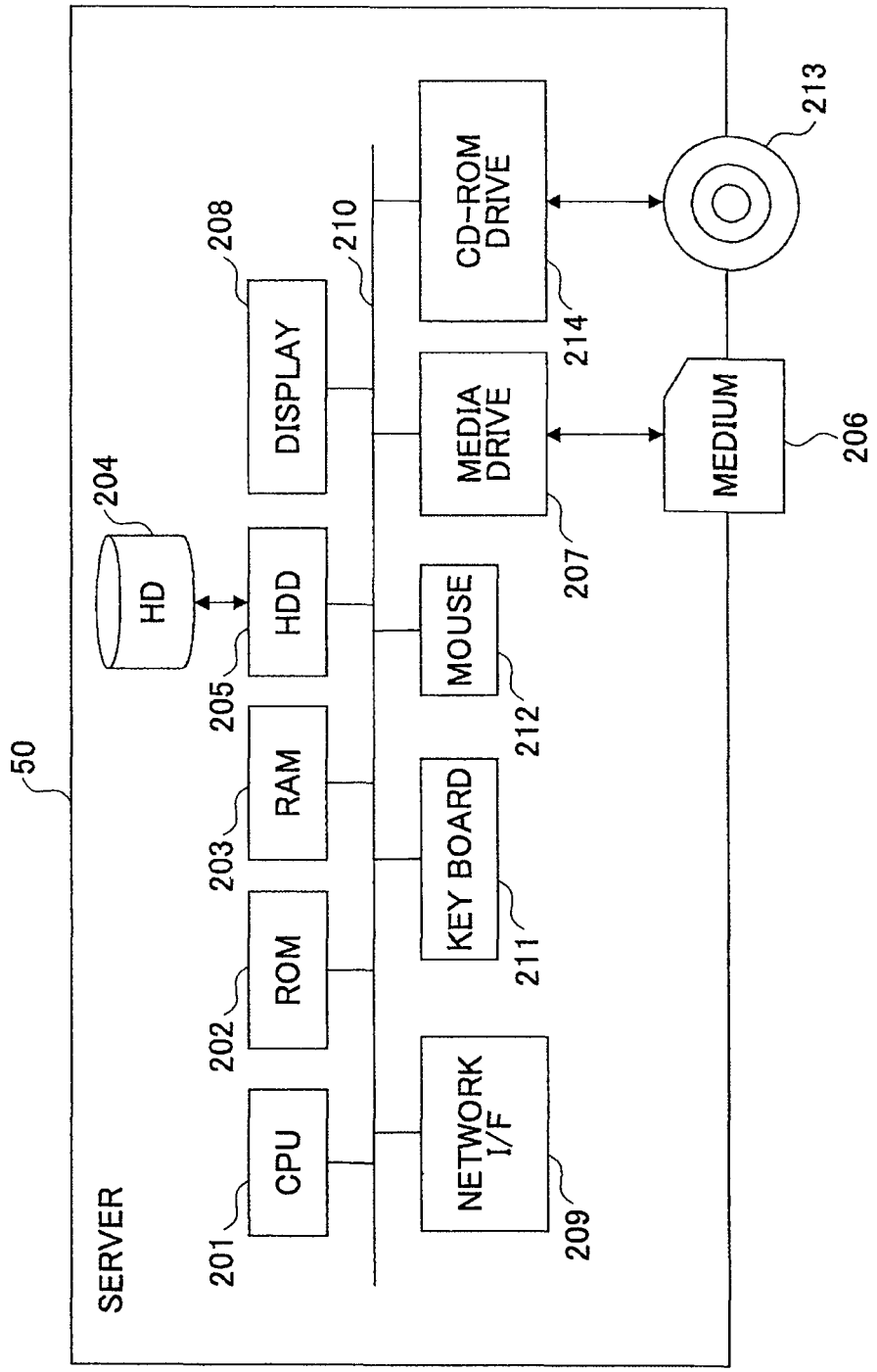
FIG. 3 is an explanatory view of an example of a hardware structure of a server.

FIG. 3 is a drawing showing an example of a hardware structure of the server 50. The server 50 includes a CPU 201, a ROM 202, a RAM 203, a HD (Hard disk) 204, a HDD (Hard disk Drive) 205, a media drive 207, a display 208, a network I/F 209, a keyboard 211, a mouse 212, a CD-ROM drive 214, and a bus line 210.

The CPU 201 completely controls the server 50. The ROM 202 stores a program for driving the CPU 201 such as an initial program loader (IPL) or the like. The RAM 203 is used as a working area of the CPU 201. The HD 204 stores various data such as a program for the server (which is simply referred to as a server program hereinafter) or the like. The HDD 205 controls reading and writing of various data from the HD 204 in accordance with the control of the CPU 201. The media drive 207 controls reading and writing (recording) of data from a recording medium 206 such as a flash memory or the like. The display 208 shows various information such as a cursor, a menu, a window, characters, images or the like. The network I/F 209 performs data transmission through the communication network 2. The keyboard 211 includes plural keys for inputting characters, numerals, various instructions and the like. The mouse 212 performs a selection or operation of various instructions, a selection of an object to be operated, a movement of the cursor or the like. The CD-ROM drive 214 controls reading or writing of various data from a compact disc read-only memory (CD-ROM) 213, which is an example of a removable recording medium. The bus line 210 may be an address bus, a data bus and the like which electrically connect the above components.

The server program may be stored in a computer readable recording medium such as the recording medium 206, the CD-ROM 213, or the like in a file format installable and executable by a computer to be distributed. The server program may be stored in the ROM 202 instead of being stored on the HD 204.

<Functional Structure of the Terminal>

FIG. 4 is an example of a functional block diagram of the terminal authentication system 100. The terminal 10 includes a sending and receiving unit 11, a login requesting unit 13, a voice data input unit 15a, a voice data output unit 15b, a destination list generating unit 20, a start up unit 17, an operational input accepting unit 12, an imaging unit 14 and a display control unit 16. These components are functions or units respectively actualized or activated by operating either of the components shown in FIG. 2 by instructions from the CPU 101 in accordance with the terminal program or other programs, such as a BIOS program or a start-up program, which will be explained later in detail. The programs are developed on the RAM 103 from the HD 122.

The sending and receiving unit 11 of the terminal 10 is actualized by an instruction from the CPU 101 in accordance with the terminal program and the network I/F 111. The sending and receiving unit 11 sends and receives various data (or information) between other terminals, apparatuses, or the server 50 through the communication network 2.

The operational input accepting unit 12 is actualized by an instruction from the CPU 101 in accordance with the BIOS program or the like, the operational button 108 and the power switch 109. The operational input accepting unit 12 accepts various inputs from a user. When the user switches on the power switch 109, for example, the operational input accepting unit 12 accepts such turning on power to provide an electric power from a source to each of the components.

The start up unit 17 is actualized by an instruction from the CPU 101 in accordance with the BIOS program or the start-up program. The start-up program is a program for starting the terminal program. Concretely, the start up unit 17 starts a series of operations for executing the terminal program when turning on the power is reported by the operational input accepting unit 12. The function of the start up unit 17 will be explained later in detail.

The login requesting unit 13 is actualized by an instruction from the CPU 101 in accordance with the terminal program. In this embodiment, the login requesting unit 13 functions as an authentication confirmation unit that sends a request for authentication to the server 50 (an external apparatus) after the start up unit 17 starts executing the terminal program and performs an authentication result confirming operation.

Concretely, the login requesting unit 13 sends, as the request for authentication, login requesting data including the terminal ID of the terminal 10 as a requesting terminal ID, a password and an IP address of the terminal 10, and to the server 50 from the sending and receiving unit 11 through the communication network 2.

In the authentication result confirming operation, the login requesting unit 13 starts providing the predetermined function upon obtaining an authentication result indicating the terminal is authenticated from the server 50. The will be explained later in detail.

The imaging unit 14 is actualized by an instruction from the CPU 101 in accordance with the terminal program, the internal camera 112 and the image sensor I/F 113. The imaging unit 14 takes a photograph of an object to obtain image data, and outputs the image data.

The voice data input unit 15a is actualized by an instruction from the CPU 101 in accordance with the terminal program and the voice data input output I/F 116. The voice data input unit 15a inputs voice data after a voice of a user is converted by the internal microphone 114 to a voice signal.

The voice data output unit 15b is actualized by an instruction from the CPU 101 in accordance with the terminal program and the voice data input output I/F 116. The voice data output unit 15b outputs voice signals to the internal speaker 115 to have the voice output from the internal speaker 115.

The display control unit 16 is actualized by an instruction from the CPU 101 in accordance with the terminal program and the display I/F 117. The display control unit 16 controls an operation of sending image data to the external display 120.

The destination list generating unit 20 generates and updates a destination list as shown in FIG. 7 based on destination list data and online status data of candidates of a destination terminal, received from the server 50, which will be explained later.

The terminal ID of the present embodiment may be identification data for uniquely identifying the terminal 10 composed of languages, characters, symbols, other various marks, or a combination of at least two of them.

<Functional Structure of the Server>

The server 50 includes a sending and receiving unit 51, a terminal authentication unit 52, a status management unit 53, a terminal extracting unit 54 and a terminal status obtaining unit 55. These components are functions or units respectively actualized or activated by operating either of the components shown in FIG. 3 by instructions from the CPU 201 in accordance with the server program which is developed on the RAM 203 from the HD 204. The HD 204 includes a terminal authentication management database (DB) 5002, a terminal management DB 5003 and a destination list management DB 5004.

(Terminal Authentication Management Table)

FIG. 5A shows an example of a terminal authentication management table stored in the terminal authentication management DB 5002. The terminal authentication management table includes terminal IDs of all of the terminals 10 managed by the server 50 with their corresponding passwords. For example, for the terminal authentication management table shown in FIG. 5A, the terminal ID of "01aa" corresponds with the password of "aaaa".

(Terminal Management Table)

FIG. 5B shows an example of a terminal management table stored in the terminal management DB 5003. The terminal management table includes terminal IDs for each of the terminals, a name of the terminal, an online status of the terminal, a date when the login requesting data is received by the server 50 from the terminal and an IP address of the terminal corresponding with the terminal ID.

(Destination List Management Table)

FIG. 5C shows an example of a destination list management table stored in the destination list management DB 5004.

The destination list management table includes the terminal ID of the terminal that requests starting of a communication via a video conference (hereinafter, simply referred to as a requesting terminal ID as well) and terminal IDs of all of the terminals that are registered as candidates of destination terminals, the opposite side in another word, of the communication (hereinafter, simply referred to as a destination terminal ID as well) with respect to the requesting terminal ID. For example, as shown in FIG. 5C, the requesting terminal ID of "01aa" is corresponding with the destination terminal IDs of "01ab", . . . , "01ba", "01bb", . . . , "01ca", "01cb", "01da", and "01db", . . . of the candidates to which the requesting terminal can request starting communication via the video conference.

The sending and receiving unit 51 is actualized by an instruction from the CPU 201 in accordance with the server program and the network I/F 209. The sending and receiving unit 51 sends and receives various data (or information) between the terminal 10, apparatuses, or systems through the communication network 2.

The terminal authentication unit 52 is actualized by an instruction from the CPU 201 in accordance with the server program. The terminal authentication unit 52 performs terminal authentication by using a combination of the requesting terminal ID and the password included in the login requesting data received through the sending and receiving unit 51, as a search key, to determine whether the same combination of terminal ID and password is stored in the terminal authentication management DB 5002. The terminal authentication unit 52 determines that the requesting terminal is authenticated and has the proper right, when the same combination of terminal ID and password is stored in the terminal authentication management DB 5002. In such a case, the terminal authentication unit 52 sends an authentication result indicating the terminal 10 is authenticated to the requesting terminal 10.

The status management unit 53 is actualized by an instruction from the CPU 201 in accordance with the server program. The status management unit 53 stores and manages the terminal ID of the requesting terminal, the online status, the date when the login requesting data is received by the server 50, and the IP address of the requesting terminal corresponding with each other in the terminal management DB 5003 in order to manage the online status of the requesting terminal that sends the login requesting data.

Further, when a user of the terminal 10 switches the power switch 109 of the terminal 10 from ON to OFF, the terminal 10 sends online status data of turning off the power to the server 50. The status management unit 53 changes the online status of the terminal management DB 5003 from ON (line) to OFF (line) based on the online status data of turning off the power sent from the terminal 10.

The terminal extracting unit 54 is actualized by an instruction from the CPU 201 in accordance with the server program. The terminal extracting unit 54 searches the destination list management DB 5004 by using the terminal ID of the requesting terminal which has sent the login requesting data as a key, and extracts the terminal IDs of the candidates of destination terminals which can communicate with the requesting terminal, by reading the terminal IDs from the destination list management DB 5004.

Further, the terminal extracting unit 54 searches the destination list management DB 5004 by using the terminal ID of a first requesting terminal which has sent the login request as a key, and extracts the terminal ID of a second requesting terminal for which the terminal ID, of the first requesting terminal, is registered as the destination terminal.

The terminal status obtaining unit 55 searches the terminal management DB 5003 by using the terminal IDs of the candidates extracted by the terminal extracting unit 54 as search keys, and reads out the online status for each of the terminal IDs extracted by the terminal extracting unit 54. By this operation, the terminal status obtaining unit 55 can obtain the online status of the candidates of destination terminals capable of having communication with the requesting terminal which has sent the login requesting data.

Here, the terminal status obtaining unit 55 searches the terminal management DB 5003 by using the terminal ID of the above-described second requesting terminal extracted by the terminal extracting unit 54 as the search key, as well, to obtain the online status of the above-described second requesting terminal.

<Operations from Turning on the Power to Displaying a Destination List>

Figure 6:
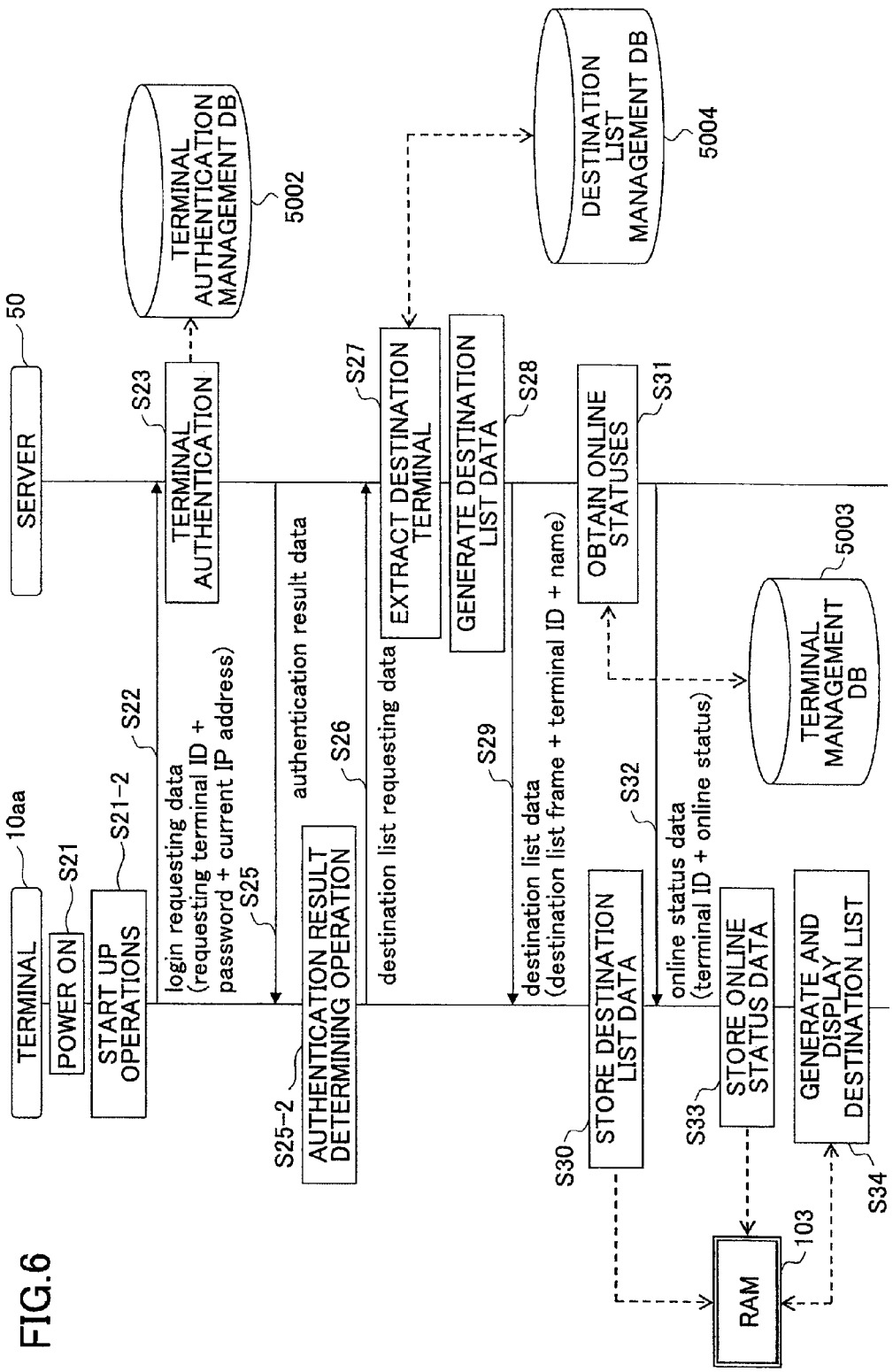
FIG. 6 is a sequence view showing an example of operations from turning on power to displaying a destination list.

FIG. 6 is a sequence view showing an example of operations from turning on the power to displaying a destination list. Hereinafter, the terminal 10 for which the switch is turned on and that sends the login requesting data to the server 50 is referred to as a terminal 10aa (or a requesting terminal 10aa).

When a user switches on the power switch 109, the operational input accepting unit 12 accepts the signal of turning on the power and switches on the power (step S21). Thereafter, the start up unit 17 performs the start up operations, which will be explained later (step S21-2).

When the start up operations are completed, the login requesting unit 13 sends the login requesting data that indicates a login request from the sending and receiving unit 11 to the server 50 through the communication network 2 upon the ON operation of the power switch 109 (step S22). The login requesting data includes the terminal ID of the terminal 10aa as the requesting terminal ID, the password, and the current IP address of the terminal 10aa. Here, as will be described later, the password is one stored in the BIOS ROM 123 so that a user of the terminal 10aa does not necessarily input a password at this time.

Then, the terminal authentication unit 52 of the server 50 performs a terminal authentication by using the combination of the requesting terminal ID and the password included in the login requesting data received through the sending and receiving unit 51 as the search key, to determine whether the same combination of terminal ID and password is stored in the terminal authentication management DB 5002 (step S23). Here, the terminal authentication unit 52 determines that the requesting terminal 10aa is authenticated as a terminal having a proper right when the same combination of terminal ID and password is stored in the terminal authentication management DB 5002.

Then, the sending and receiving unit 51 of the server 50 sends authentication result data including the result determined by the terminal authentication unit 52 through the communication network 2 to the requesting terminal 10*aa* (step S25). When the terminal authentication unit 52 determines that the requesting terminal 10*aa* is authenticated in step S23, the authentication result data includes the result indicating the terminal 10 is authenticated. However, when the terminal authentication unit 52 determines that the requesting terminal 10*aa* is not authenticated in step S23, the authentication result data includes the result indicating the terminal 10 is not authenticated.

In this embodiment, it is assumed that the terminal authentication unit 52 of the server 50 determines that the requesting terminal 10*aa* is authenticated in step S23 and the authentication result data includes the result indicating the terminal 10 is authenticated.

Subsequently, the login requesting unit 13 performs the authentication result determining operation, which will be explained later (step S25-2).

When the requesting terminal 10*aa* receives the authentication result data including the result indicating the terminal 10 is authenticated, the sending and receiving unit 11 sends destination list requesting data for requesting a destination list to the server 50 through the communication network 2 (step S26). The sending and receiving unit 51 of the server 50 receives the destination list requesting data.

The terminal extracting unit 54 searches the destination list management DB 5004 by having the terminal ID "01aa" of the requesting terminal 10*aa*, as a search key, and extracts the terminal ID and the destination name corresponding to the terminal ID of the candidate of the destination terminal which is capable of having a communication with the requesting terminal 10*aa* (step S27).

The terminal extracting unit 54 of the server 50 reads out a record corresponding with the terminal ID of the candidate of the destination terminal from the terminal management table in the terminal management DB 5003, and generates "destination list data" (including a destination list frame, terminal IDs, and names)" from the record (step S28). The sending and receiving unit 51 of the server 50 sends the destination list data to the requesting terminal 10*aa* (step S29).

At the requesting terminal 10*aa*, the sending and receiving unit 11 receives the destination list data, and stores the destination list data in the RAM 103 (step S30).

The terminal status obtaining unit 55 of the server 50 searches the terminal management DB 5003 by having the terminal IDs ("01ab", "01ba", "01db", . . . ) of the candidates of destination terminals extracted by the terminal extracting unit 54 as the search keys, and obtains the online status of each of the terminal IDs of the candidates (10*ab*, 10*ba*, 10*bb*, . . . ) of the destination terminals extracted by the terminal extracting unit 54 by reading out the corresponding online statuses (step S31).

Subsequently, the sending and receiving unit 51 of the server 50 sends "online status data" including the terminal ID such as "01ab" used as the search key in step S27 and the corresponding online status such as "ON line (communication capable)" or the like to the requesting terminal 10*aa* through the communication network 2 (step S32).

Subsequently, the requesting terminal 10*aa* stores the online status data received from the server 50 in the RAM 103 (step S33). Therefore, the requesting terminal 10*aa* can obtain the current online statuses of the candidates of destination terminals such as a terminal 10*ab* or the like which is capable of having a communication with the requesting terminal 10*aa* by receiving the online status data of each of the terminals.

The destination list generating unit 20 of the requesting terminal 10*aa* generates a destination list based on the destination list data stored in the RAM 103 and controls a timing when the display control unit 16 display the destination list on the external display 120 (step S34). At this time, the candidates of destination terminals which are not activated (being off line or the like) may be removed from the destination list or may be shown as not being activated in the destination list.

FIG. 7 is a drawing showing an example of the destination list generated by the destination list generating unit 20 in step S34.

The destination list 500 includes "icon for showing online status of the terminal" (just shown as "icon"), "online status data of the destination terminal" (just shown as "online status data"), and "destination name/terminal ID" for each of the destination terminals.

The name and the terminal ID of the user's terminal are shown at the last line of the destination list 500 in FIG. 7. Further, image data 502 taken by the imaging unit 14 of the user's terminal is shown at the right bottom of the destination list 500. The destination list generating unit 20 displays a screen data including the destination name, the terminal ID and the image of the user's terminal. With such information, users can adjust and prepare the position of the internal camera 112 or the like before calling the destination terminal.

<Start-Up Operation>

As shown as step S22 in FIG. 6, although the terminal 10*aa* sends the requesting terminal ID and the password to the server 50, there may be a case where the terminal 10 does not include a UI such as an input unit to receive an input of the password by a user. Further, even if the terminal 10 includes an input unit to receive an input of the password by a user, functionality may be reduced by requesting input of a password from a user. Therefore, the terminal 10 of the embodiment previously stored the password so that a user is not required to input the password to have the server 50 authenticate the terminal 10.

Figure 8:
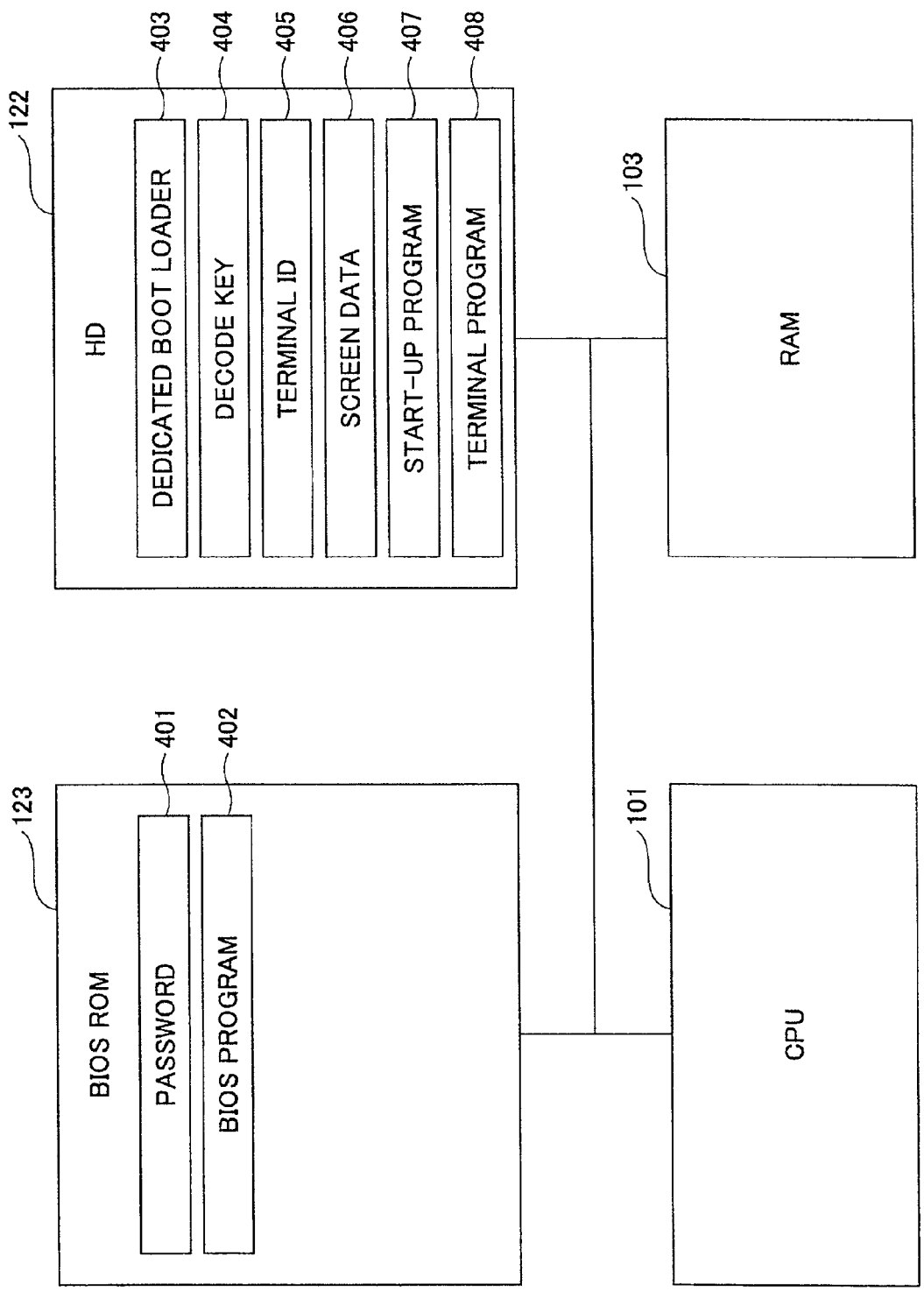
FIG. 8 is a block diagram of a part of the hardware structure of the terminal shown in FIG. 2.

FIG. 8 is a block diagram of a part of the hardware structure of the terminal 10 shown in FIG. 2.

The BIOS ROM 123 (a second recording medium) includes a password storage area (a password storage unit) that stores a password 401, which will be included in the login requesting data to be sent to the server 50, and a BIOS program storage area that includes a BIOS program 402. The BIOS program 402 is performed first after power is turned on.

The HD 122 (a first recording medium) stores a dedicated boot loader 403, a decode key 404 (a first decode key), terminal ID 405, screen data 406, a start-up program 407 (execution starting data) and a terminal program 408. The start-up program 407 performs starting execution of the terminal program 408.

In this embodiment, the terminal ID 405, the screen data 406, the start-up program 407 and the terminal program 408 are stored on the HD 122 of the terminal 10 in encoded manner capable of being decoded by the decode key 404 so that a third party cannot read the contents without possessing the decode key 404. Therefore, a person having no proper rights cannot use this data of the HD 122 by copying the data or manipulate the data. The decode key 404 may be a symmetric key and the terminal ID 405, the screen data 406, the start-up program 407 and the terminal program 408 may be encoded by the decode key 404. Alternatively, the terminal ID 405, the screen data 406, the start-up program 407 and the terminal program 408 may be encoded by another key that corresponds to the decode key 404 using public key cryptography or the like.

As the decode key 404 is also stored on the HD 122, if the decode key 404 is not encoded, the encoded data stored on the HD 122 may be relatively easily decoded by the decode key 404. Therefore, in this embodiment, the decode key 404 is encoded by the password 401, that is stored in the BIOS ROM 123, which is a recording medium physically different from the HD 122.

Alternately, the decode key 404 may be stored on the HD 122 in an encoded manner capable of being decoded by another key (a second decode key), different from the password 401, stored in the BIOS ROM 123 (second decode key storage unit). By using another key, different from the password 401 that is sent to the server 50, for decoding the encoded decode key 404, security can be strengthened.

Although the HD 122 is described as a boot disk in this embodiment, the same operations are performed when the CPU 101 is initiated by the flash memory 104 through the SSD 105. In such a case, the above-described data stored on the HD 122 may be stored in the flash memory 104 in the same manner. Therefore, the flash memory 104 functions as a first recording medium.

Figure 9:
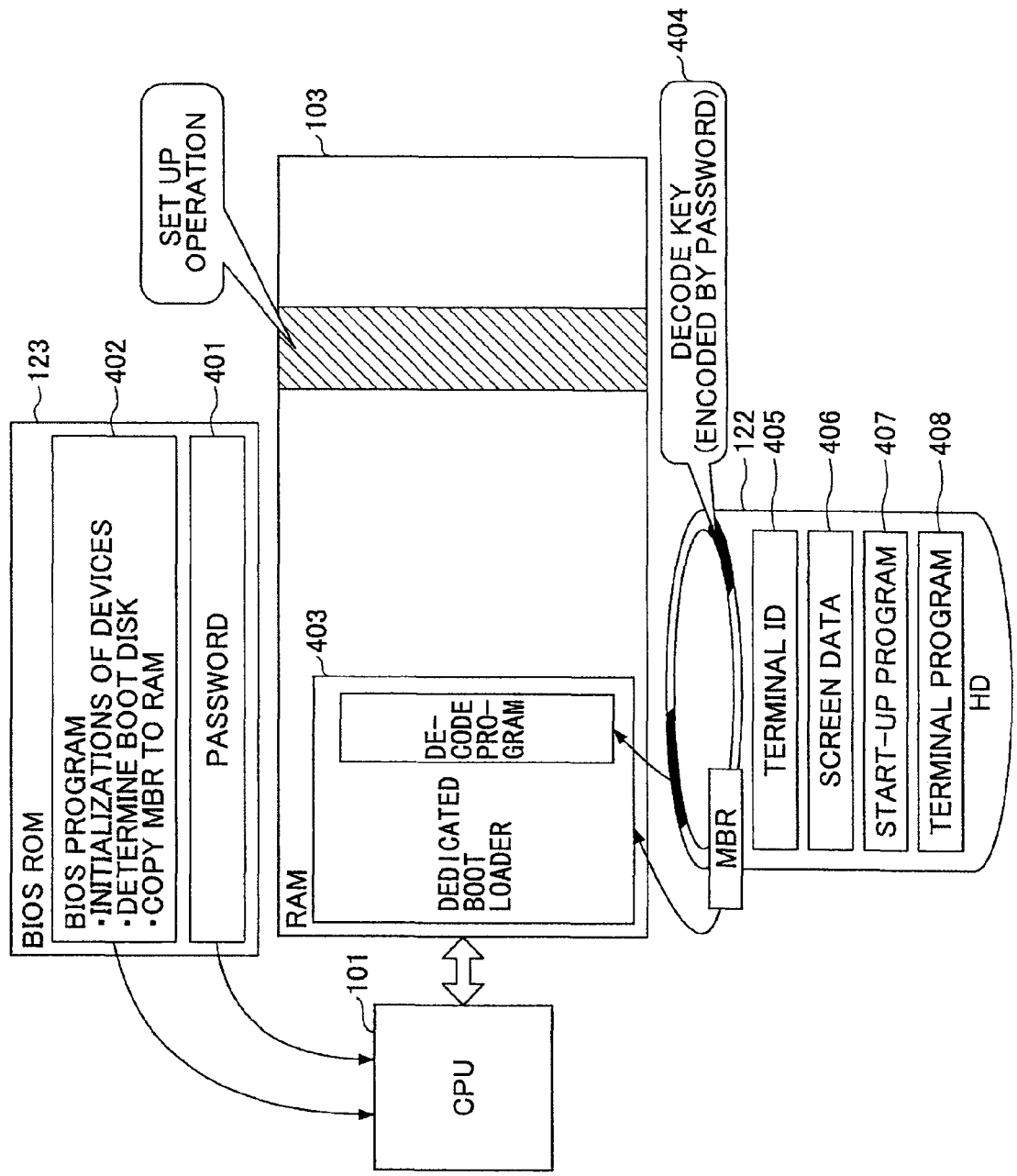
FIG. 9 is an explanatory view showing an example of a method of decoding the data stored in the HD.
Figure 10:
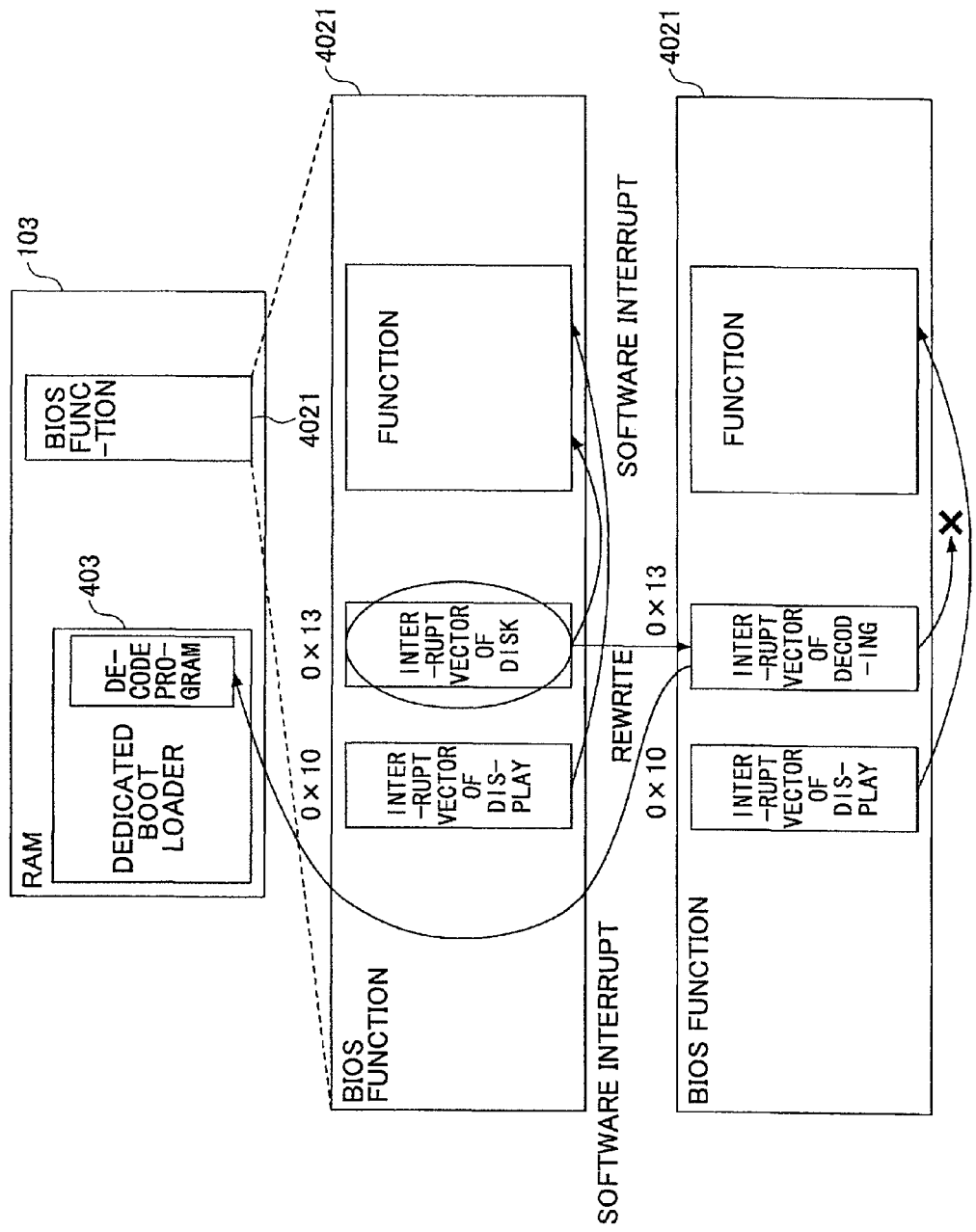
FIG. 10 is an explanatory view showing an example of a method of decoding the data stored in the HD.

FIG. 9 and FIG. 10 are explanatory views showing an example of a method of decoding the data stored on the HD 122. This method is performed by the start up unit 17.

As shown in FIG. 9, the HD 122 includes a master boot record (MBR) at Track 0. The dedicated boot loader 403 and the decode key 404 are stored at Track 0 (a first decode key storage unit). In this embodiment, a decode program may also be stored at Track 0 of the HD 122. The dedicated boot loader 403 can call the decode program from Track 0. The decode program may be encoded or may not be encoded. When the decode program is not encoded, the decode program may be stored anywhere else such as the flash memory 104 or the like. The terminal ID 405, the screen data 406, the start-up program 407, and the terminal program 408 are stored at areas (a first storage unit or a second storage unit) other than Track 0 of the HD 122.

In this embodiment, as the decode key 404 necessary to decode the terminal ID 405, the start-up program 407, and the terminal program 408 is encoded by the password 401, which is not stored on the HD 122, even when others remove the HD 122, encoded data cannot be read out.

Figure 11:
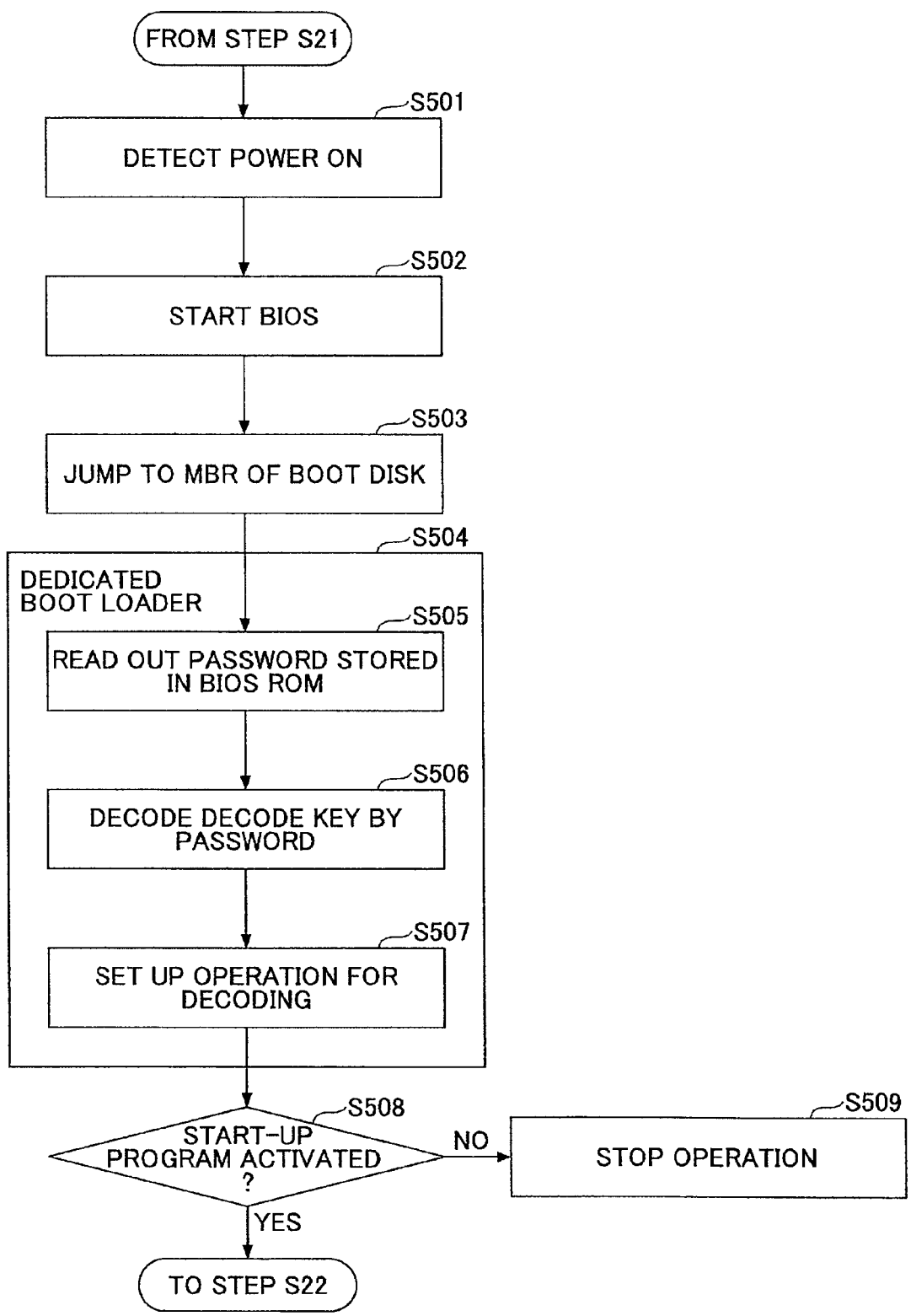
FIG. 11 is a drawing showing an example of a start-up operation of the terminal.

FIG. 11 is a drawing showing an example of the start-up operation of the terminal 10.

When a user switches on power (step S501), the CPU 101 starts execution of the BIOS program 402 stored in the BIOS ROM 123 (step S502). Firstly, the BIOS program 402 performs initializations for peripheral devices such as the RAM 103 which requires an initialization and diagnostics of the peripheral devices.

The BIOS program 402 then determines a drive or a disk to boot in accordance with the priority of the boot disks stored in the BIOS ROM 123. For example, the priority of the boot disks such as a CD-ROM, a floppy (registered trademark) disk, a hard disk, a USB memory or the like may be set by a user.

Then, the BIOS program 402 searches whether a recording medium is attached to for the boot disk with the higher priority. When the BIOS program 402 finds a recording medium is attached to the searched boot disk, the BIOS program 402 copies a code from the MBR of the boot disk to the RAM 103, and sets a starting address of the code to a program counter of the CPU 101 (step S503). In this embodiment, it is assumed that the boot disk is the HD 122 hereinafter. Then, the CPU 101 moves to control the boot disk after control of the BIOS.

The code executed by the CPU 101 is a command to jump to the dedicated boot loader 403. With this, the dedicated boot loader 403 is copied to the RAM 103, and the CPU 101 can execute the dedicated boot loader 403 (step S504). When the MBR has a large enough capacity to store the dedicated boot loader 403, the dedicated boot loader 403 may be stored in the MBR.

The dedicated boot loader 403 reads out the password 401 stored in the BIOS ROM 123 (step S505). As the password 401 is stored in a specific fixed address, the dedicated boot loader 403 reads out the password 401 by setting the address in a register of the CPU 101. The password 401 is then stored in the RAM 103.

Subsequently, the dedicated boot loader 403 reads out the decode key 404 stored in a previously fixed address of Track 0 and decodes it by the password 401 (step S506). The decoded decode key 404 is then stored in the RAM 103.

The dedicated boot loader 403 also reads out the decode program stored at Track 0 and develops it in the RAM 103. The decode program is performed by interrupting the CPU 101 reading data from the HD 122 to decode the data by the decode key 404.

Then, the dedicated boot loader 403 performs a set up operation for decoding (step S507). FIG. 10 shows an example of the set up operation. As the BIOS ROM 123 provides a uniform interface for inputting and outputting of various peripheral devices, a software interruption occurs for using the BIOS ROM 123 every time the CPU 101 accesses the HD 122. Hereinafter, input and output functions by the BIOS ROM 123 are referred to as a BIOS function.

The BIOS function 4021 is copied to a predetermined area (640 k byte to 1024 k byte) of the RAM 103 by the BIOS program 402. The BIOS function 4021 is capable of being called by a program executed by the CPU 101. Concretely, The BIOS function 4021 can be called by setting an argument of the BIOS function 4021 in a predetermined register of the CPU 101, and executing a command called "INT". For example, the CPU 101 executes a command starting with "INT13" to access a disk. With this, an interrupt vector of "0x13" is instructed and the CPU 101 performs a function corresponding to the interrupt vector by an internal interruption (software interruption).

In this embodiment, the dedicated boot loader 403 writes an interrupt vector of decoding at "0x13" to hook an interruption by the interrupt vector of "0x13". This is the set up operation.

The interrupt vector of decoding is an interrupt vector for having the CPU 101 execute the decode program. By the set up operation, the interrupt vector of decoding can hook the software interrupt for reading out, by using the BIOS function 4021 when the CPU 101 accesses the HD 122 so that the decoding operation can be performed. Here, the operation of the CPU 101 when accessing the HD 122 follows the interrupt vectors set in the set up operation.

Now, referring to FIG. 11, the dedicated boot loader 403 reads out an address where the start-up program 407 is stored on the HD 122, and starts the execution of the start-up program 407 (step S508). As described above, the start-up program 407 is encoded and is capable of being decoded by the decode key 404. It means that the area on the HD 122 where the address of the start-up program 407 is stored may be encoded. The CPU 101 decodes the area where the address of the start-up program 407 is stored by using the software interrupt for reading out, which is rewritten to the interrupt vector of decoding as described above.

When the operations of steps S501 to S507 are normally performed, the start-up program 407 is activated to decode and activate the terminal program 408. At this time, the terminal ID 405 is also decoded. Then, the operations moves to step S22 (see FIG. 6) and the terminal 10 sends the login requesting data to the server 50.

Among operations of steps S501 to S507, for example, when the dedicated boot loader 403 fails to read out the password 401 (step S505), fails to read out the decode key 404 (step S506), or fails to decode the decode key 404 by the password 401 (step S506), the dedicated boot loader 403 cannot decode the area of the HD 122 where the address of the start-up program 407 is stored. As a result, the CPU 101 cannot start the start-up program 407 because the CPU 101 starts execution of the start-up program 407 with setting a wrong address in the program counter. In such a case, the dedicated boot loader stops as the programs are frozen (step S509). It means that the operation is terminated without showing the reason of not activating to a user by an error message or the like. With this operation, the operation is terminated without showing that a password is necessary for the activation or the like to a third party. Therefore, even when the data stored on the HD 122 are copied to other apparatuses or recording mediums, a person having no proper rights cannot use the functions of the terminal 10 or the server 50.

For example, the terminal ID 405, which is included in the login requesting data sent by the login requesting unit 13 to the server 50 in step S22, is stored on the HD 122 in an encoded manner. Therefore, the server 50 cannot authenticate the terminal ID 405 without decoding the terminal ID 405 by the decode key 404 which is also encoded by the password 401. Therefore, the security can be strengthened.

<Authentication Result Confirming Operation>

Further, even when the terminal program 408 is normally activated, by performing the authentication result confirming operation (step S25-2), the security can further be strengthened.

Figure 12:
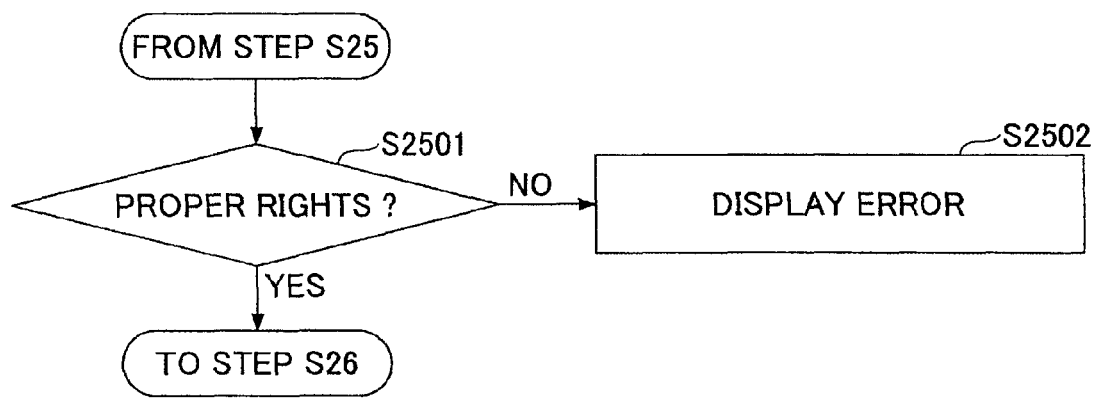
FIG. 12 is a flowchart showing an example of an authentication result confirming operation.

FIG. 12 is a flowchart showing an example of an authentication result confirming operation.

When the login requesting unit 13 of the terminal 10aa receives the authentication result data in step S25 (see FIG. 6), the login requesting unit 13 determines whether the authentication result indicates that the terminal 10aa is authenticated by the server 50 to have the proper rights (step S2501).

When the authentication result indicates that the terminal has the proper rights (Yes in step S2501), the operation proceeds to step S26 of FIG. 6.

When, on the other hand, the authentication result does not indicate that the terminal has the proper rights (No in step S2501), the login requesting unit 13 displays an error message on the external display 120 and terminates the operation (step S2502).

Figure 13:
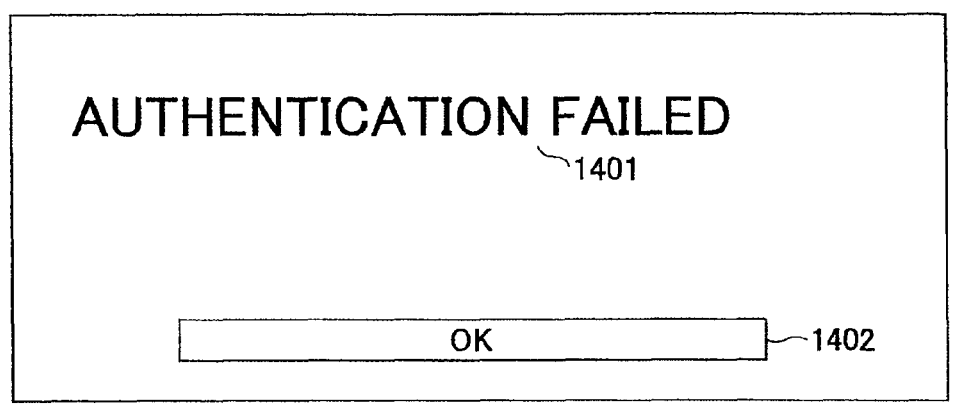
FIG. 13 is a drawing showing an example of the error message shown on the display.

FIG. 13 is a drawing showing an example of the error message shown on the external display 120. As shown in FIG. 13, a message 1401 such as "Authentication failed" and an OK button 1402 which can be pushed by a user are shown. The screen data 406 (see FIG. 8) includes characters and icons for displaying this message 1401 and the button 1402. The screen data 406 is stored on the HD 122 of the terminal 10, and the login requesting unit 13 accesses the HD 122 to have the display control unit 16 display this message 1401 and the like. In this embodiment, the screen data 406 may be encoded and stored on the HD 122. In such a case, when the login requesting unit 13 reads out the screen data 406, decoding is performed by a software interrupt.

When a user pushes the OK button 1402, the login requesting unit 13 can delete the dialog box. Alternatively, the termination operation may be performed right after the user pushes the OK button 1402 to switch off the power so that others having bad intentions cannot use the terminal 10 anymore.

As described above, according to the terminal authentication system 100 of the embodiment, the start-up program 407 of the terminal 10 is stored in an encoded manner and is decoded by the decode key 404, which is decoded by the password 401 stored in the BIOS ROM 123. Therefore, even when others having bad intentions remove the HD 122 from the terminal 10 having a proper right in order to use in other devices, the terminal program 408 cannot be activated. Further, as the authentication of the terminal 10 is performed after the terminal program 408 is activated, the security for the authentication of the terminal 10 can be strengthened.

Further, as it is not necessary for a user to input the password 401, security can be maintained even for a small size of the terminal 10 which does not have a UI for inputting the password 401.

Further, although the server 50 for a video conference and the terminal 10 which participates in the video conference are described as an example, the above embodiment can be applied to the server 50 and the terminal 10 which have other various functions.

According to the present embodiment, when the terminal 10 is a built-in type apparatus that does not include a UI for inputting ID or a password and it is difficult to input, the ID and the password can be sent to the server 50 without having a user input the ID or the password because the ID or the password, as the ID and the password are stored in the terminal 10.

Further, the ID is stored on the HD 122 in an encoded manner capable of being decoded by the decode key, which also needs to be decoded by the password stored in the BIOS ROM 123, which is a physically separate recording medium from the HD122. Therefore, even when a third party removes the HD 122 from the terminal 10 and attaches to another apparatus, the ID cannot be decoded and the third party cannot use the function of the terminal program or the function of the server 50 via another apparatus.

As described above, when the terminal 10 does not include a UI for inputting ID or a password, it is impossible for a user to input a password. Therefore, it is difficult to authenticate the user having proper rights. However, according to the present embodiment, the security is strengthened and the ID and the password can be sent to the server 50 after the decode key is decoded by the password and the ID is decoded by the decode key, without having a user input the ID or the password.

According to the present embodiment, a data processing apparatus capable of authentication without requesting a password from a user.

The present invention is not limited to the specifically disclosed embodiments, and variations and modifications may be made without departing from the scope of the present invention.

The present application is based on Japanese Priority Application No. 2011-006934 filed on Jan. 17, 2011, and on Japanese Priority Application No. 2011-253177 filed on Nov. 18, 2011, the entire contents of which are hereby incorporated herein by reference.

What is claimed is:

1. A data processing apparatus providing a predetermined function by executing a program for the data processing apparatus, comprising:

an operational input that accepts turning on power;
a first memory configured to store encoded execution starting data for starting execution of the program for the data processing apparatus;
a second memory configured to store a first decode key capable of decoding encoded execution starting data;
processing circuitry configured to
obtain the first decode key from the second memory when the operational input accepts turning on the power and decode the encoded execution starting data by the first decode key to start executing the program for the data processing apparatus,
send a request for authentication to an external apparatus after starting execution of the program for the data processing apparatus, and
start providing the predetermined function when obtaining an authentication result indicating the apparatus is authenticated from the external apparatus.

2. The data processing apparatus according to claim 1, further comprising:
a third memory configured to store a second decode key, the third memory being provided in a recording medium physically different from the second memory,
wherein the first decode key is stored in the first memory in an encoded manner capable of being decoded by the second decode key, and
the processing circuitry reads out the second decode key from the third memory, and decodes the encoded first decode key by the second decode key to obtain the first decode key.

3. The data processing apparatus according to claim 2, further comprising:
a fourth memory configured to store terminal identification data that uniquely identifies the apparatus to be included in the request for authentication which is sent by the processing circuitry unit in an encoded manner capable of being decoded by the first decode key; and
a fifth memory configured to store a password to be included in the request for authentication which is sent by the processing circuitry, the fifth memory being composed of physically different medium from the first memory, the fourth memory and the second memory,
wherein the processing circuitry decodes the terminal identification data by the first decode key and sends the request for authentication including the decoded terminal identification data and the password to the external apparatus.

4. The data processing apparatus according to claim 1, further comprising:
a fourth memory configured to store terminal identification data that uniquely identifies the apparatus to be included in the request for authentication which is sent by the processing circuitry; and
a fifth memory configured to store a password to be included in the request for authentication, the fifth memory being composed of a medium physically different from the first memory, the fourth memory and the second memory,
wherein the processing circuitry sends the request for authentication including the terminal identification data and the password to the external apparatus.

5. The data processing apparatus according to claim 4, wherein the terminal identification data is stored in the fourth memory in an encoded manner capable of being decoded by the first decode key,
the first decode key is stored in the first memory in an encoded manner capable of being decoded by the password,
the processing circuitry
reads out the password from the fifth memory, and decodes the first decode key by the password, and
decodes the terminal identification data by the first decode key and sends the request for authentication including the decoded terminal identification data and the password to the external apparatus.

6. The data processing apparatus according to claim 4, wherein the first decode key is stored in the first memory in an encoded manner capable of being decoded by the password, and
the processing circuitry reads out the password from the fifth memory, and decodes the first decode key by the password to obtain the first decode key.

7. The data processing apparatus according to claim 1, wherein the predetermined function is to obtain a terminal list including lists of terminals capable of having communication with the apparatus from the external apparatus by sending terminal identification data that uniquely identifies the apparatus to the external apparatus, to display the terminal list, and to start a communication with a terminal which is selected from the terminal list.

8. The data processing apparatus according to claim 1, wherein the processing circuitry terminates an operation of starting execution of the program for the data processing apparatus without displaying a message when the encoded execution starting data is not decoded.

9. The data processing apparatus according to claim 1, wherein the processing circuitry causes display of an error message when the authentication result indicating it is authenticated is not obtained from the external apparatus.

10. The data processing apparatus according to claim 1, wherein the first memory and the second memory are provided in a first recording medium.

11. The data processing apparatus according to claim 10, wherein the first recording medium is a hard disk.

12. The data processing apparatus according to claim 10, wherein the first decode key is stored in the first memory in an encoded manner capable of being decoded by a second decode key which is stored in a second recording medium physically different from the first recording medium.

13. The data processing apparatus according to claim 12, wherein the second recording medium is a BIOS ROM.

14. The data processing apparatus according to claim 12, wherein the second decode key is a password which is to be included in the request for authentication which is sent by the processing circuitry.

15. A non-transitory computer-readable recording medium having recorded thereon a program that causes a data processing unit, which is composed of a computer, stores encoded execution starting data for starting execution of a program for the data processing apparatus, a first decode key capable of decoding the encoded execution starting data, and provides a predetermined function, to execute a method, comprising:
accepting turning on the power;
obtaining the first decode key when turning on the power is accepted and decoding the encoded execution starting data by the first decode key to start executing the program for the data processing apparatus;
sending a request for authentication to an external apparatus after starting execution of the program for the data processing apparatus; and starting to provide the function when obtaining an authentication result indicating the apparatus is authenticated from the external apparatus.

16. A data processing apparatus providing a predetermined function by executing a program for the data processing apparatus, comprising:

accepting turning on power;

storing, at a first memory, encoded execution starting data for starting execution of the program for the data processing apparatus;

storing, at a second memory, a first decode key capable of decoding the encoded execution starting data;

obtaining, via processing circuitry, the first decode key from the second memory when the operational input accepts turning on the power and decodes the encoded execution starting data by the first decode key to start executing the program for the data processing apparatus;

sending, via the processing circuitry, a request for authentication to an external apparatus after starting execution of the program for the data processing apparatus; and providing, via the processing circuitry, the predetermined function when obtaining an authentication result indicating the apparatus is authenticated from the external apparatus.

* * * * *